(12) United States Patent
De Kock et al.

(10) Patent No.: US 9,093,839 B2
(45) Date of Patent: Jul. 28, 2015

(54) POLE-SLIP PROTECTION SYSTEM AND METHOD FOR SYNCHRONOUS MACHINES

(75) Inventors: Jan Abraham De Kock, Potchefstroom (ZA); Lafras Lamont, West Australia (AU)

(73) Assignee: NORTH-WEST UNIVERSITY, Potchefstroom (ZA)

( * ) Notice: Subject to any disclaimer, the term of this patent is extended or adjusted under 35 U.S.C. 154(b) by 514 days.

(21) Appl. No.: 13/514,905

(22) PCT Filed: Dec. 8, 2010

(86) PCT No.: PCT/IB2010/055663
§ 371 (c)(1),
(2), (4) Date: Apr. 1, 2013

(87) PCT Pub. No.: WO2011/070520
PCT Pub. Date: Jun. 16, 2011

(65) Prior Publication Data
US 2013/0176648 A1 Jul. 11, 2013

(30) Foreign Application Priority Data
Dec. 10, 2009 (ZA) .................................. 2009/08800

(51) Int. Cl.
*H02H 5/04* (2006.01)
*H02H 7/08* (2006.01)
*H02H 3/48* (2006.01)
(Continued)

(52) U.S. Cl.
CPC ............. *H02H 3/48* (2013.01); *H02P 9/009* (2013.01); *H02P 9/10* (2013.01); *H02P 9/302* (2013.01); *H02P 25/023* (2013.01); *H02P 29/02* (2013.01); *H02H 1/04* (2013.01); *H02H 7/0805* (2013.01)

(58) Field of Classification Search
CPC ............................... H02H 1/04; H02H 7/0805
USPC ........................................................... 361/23
See application file for complete search history.

(56) References Cited

U.S. PATENT DOCUMENTS 4,079,434 A * 3/1978 Elmore ........................... 361/79
5,731,943 A * 3/1998 Roberts et al. .................. 361/80
(Continued)

OTHER PUBLICATIONS

International Search Report for PCT/IB2010/055663, mailed Oct. 28, 2011.
(Continued)

*Primary Examiner* — Erick Glass
(74) *Attorney, Agent, or Firm* — Nixon & Vanderhye, PC

(57) ABSTRACT

A method of protecting a synchronous machine (10) connected to an electricity network (12) against pole-slip comprises the steps of continuously monitoring a power transfer angle (δ) between an electromotive force (EMF) of the machine and a reference voltage $V_{ref}$. In the event of a fault (24) on the electricity network which may result in pole-slip of the machine (10), deriving a representation of power transfer (P) relating to the machine against the power transfer angle (δ) utilizing data relating to a value of a current or a voltage measured on a terminal (26) of the machine before the fault has occurred and computed data relating to an expected future value of a current or voltage on the terminal (26), after the fault has occurred. The method then utilizes the representation and a stability criterion to predict whether the machine (10) may become unstable and if instability is predicted, causes the machine (10) to be disconnected at 32 or 34 from the electricity network (12).

24 Claims, 18 Drawing Sheets

(51) Int. Cl.
  *H02P 9/00*   (2006.01)
  *H02P 9/10*   (2006.01)
  *H02P 9/30*   (2006.01)
  *H02P 25/02*  (2006.01)
  *H02P 29/02*  (2006.01)
  *H02H 1/04*   (2006.01)

(56) References Cited

U.S. PATENT DOCUMENTS 5,898,287 A * 4/1999 Roberti et al. ............... 318/605
6,324,039 B1 * 11/2001 Gross, Jr. ..................... 361/86
2005/0073279 A1 * 4/2005 Fenley ......................... 318/717

OTHER PUBLICATIONS

Centeno et al., "An Adaptive Out-of-Step Relay", IEEE Transactions on Power Delivery, vol. 12, No. 1, (Jan. 1, 1997), pp. 61-71.

Danku et al., "Fast Prediction of the Power-Swing Curve Across Transmission Lines During Wide Area Disturbances", Power Systems Conference, (Mar. 10, 2009), pp. 1-5.

Centeno et al., "Adaptive Out-of-Step Relay with Phasor Measurement", Developments in Power System Protection, (Mar. 25, 1997), pp. 210-213.

Sanaye-Pasand, "Study, Comparison and Simulation of Power System Swing Detection and Prediction Methods", 2003 IEEE Power Engineering Society General Meeting, vol. 1, (Jul. 13, 2003), pp. 27-32.

Daqiang et al., "The Out-of-Step Protection with Prediction Function for Generators", Electrical Machines and Systems, vol. 1, (Aug. 18, 2001), pp. 127-130.

* cited by examiner

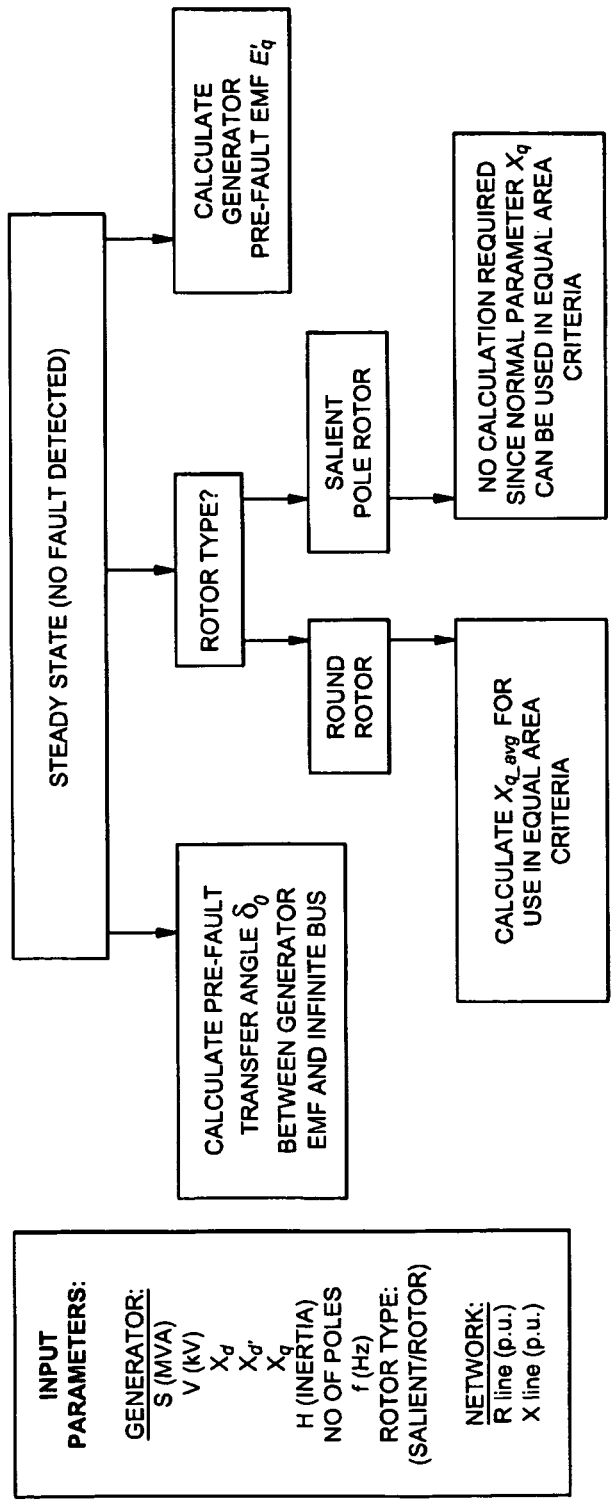
FIGURE (6a)

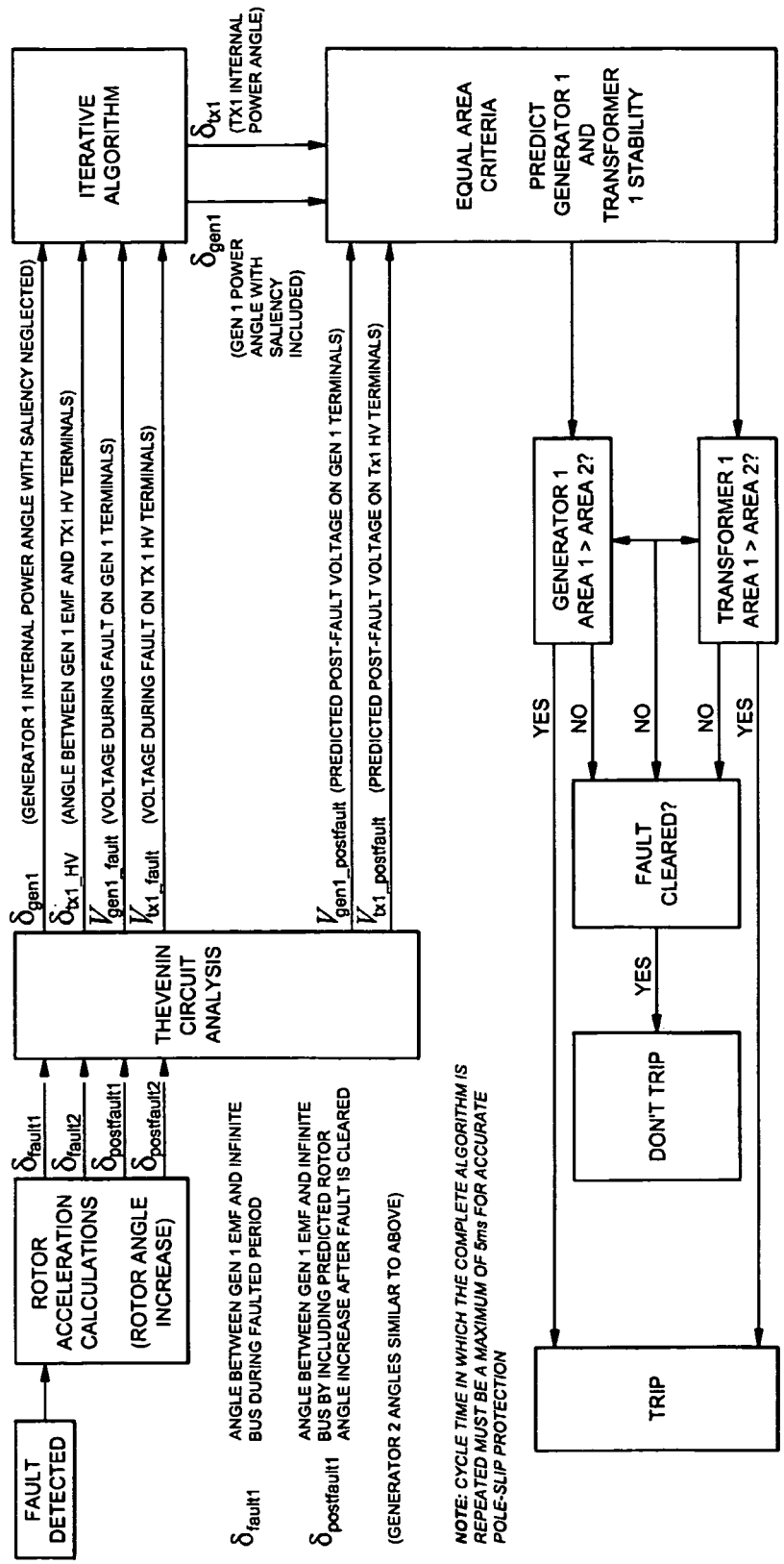
FIGURE (6b)

POLE-SLIP PROTECTION SYSTEM AND METHOD FOR SYNCHRONOUS MACHINES

This application is the U.S. national phase of International Application No. PCT/IB2010/055663, filed 8 Dec. 2010, which designated the U.S. and claims priority to South Africa Application No. 2009/08800, filed 10 Dec. 2009, the entire contents of each of which are hereby incorporated by reference.

INTRODUCTION AND BACKGROUND

This invention relates to protection systems and methods for synchronous machines and more particularly to a method of protecting a synchronous machine arrangement connected to an electricity network against pole-slip and a pole-slip protection relay.

Pole-slipping in synchronous machines occurs when there is insufficient electromagnetic torque to hold the rotor in synchronism with the stator magnetic flux. Typically, pole-slipping occurs under severe fault conditions that cause a transient torque which exceeds the ability of the rotor magnetic field to keep the rotor synchronized with the stator rotating magnetic field. Synchronous generators may pole-slip due to faults in the network, power swings and loss-of-excitation. Synchronous motors may pole-slip during under-voltage conditions, loss of excitation and during sudden mechanical failure.

For example, in the case of a generator connected to a network and driven by a prime-mover in the form of a turbine, in the event of a large fault on the network, the rotor experiences a sudden physical and electrical shift in position relative to the stator. When this occurs, violent acceleration and deceleration forces associated with pole-slipping cause enormous stress on the generator and prime-mover. These extreme stresses may result in damage such as winding movement, shaft fracture and even total destruction.

The known pole-slip protection apparatus and methods make use of an impedance scheme pole-slip protection algorithm to detect pole-slip. These apparatus and methods are reactive in nature in that they first trip a machine after it has pole-slipped one or more times. Severe mechanical damage could be caused by just one pole-slip. To the best of the applicant's knowledge, there is not currently available a pole-slip protection apparatus and method that operate preventatively.

OBJECT OF THE INVENTION

Accordingly, it is an object of the present invention to provide an alternative pole-slip protection method and apparatus with which the applicant believes the aforementioned disadvantages may at least be alleviated or which may provide a useful alternative for known apparatus and methods.

SUMMARY OF THE INVENTION

According to the invention there is provided a method of protecting a synchronous machine arrangement connected to an electricity network against pole-slip, the method comprising the steps of:
continuously monitoring a first variable parameter relating to the machine arrangement with reference to a reference value;
in the event of a fault on the electricity network which may result in pole-slip of the machine arrangement, deriving a representation of a second parameter relating to the machine arrangement against the first parameter utilizing data relating to a value of a third parameter relating to the machine arrangement before the fault has occurred and computed data relating to an expected future value of a fourth parameter relating to the machine arrangement after the fault has occurred;
utilizing the representation and a stability criterion to predict whether the machine arrangement may become unstable; and
if instability is predicted, causing the machine arrangement to be disconnected from the electricity network.

Hence, the machine arrangement is disconnected from the network before the machine arrangement becomes unstable. The machine arrangement may be disconnected from the network, before or after the fault is cleared.

The first parameter may be a power transfer angle between an electromotive force (EMF) of the machine arrangement and the reference value in the form of a reference voltage ($V_{ref}$), the second parameter may be power transfer relating to the machine arrangement, the third parameter may be at least one of an actual voltage and current measured on a terminal of the machine arrangement and the fourth parameter may be at least one of a voltage and a current on the terminal of the machine arrangement.

The reference voltage may be chosen at an infinite bus in the electricity network.

The method may comprise the step of utilizing the representation and the stability criterion to compute a critical value of the first parameter at which the fault must be cleared for the machine arrangement to regain stability and if the first parameter reaches the critical value, the machine arrangement is caused to be disconnected from the network.

The stability criterion may be the equal area stability criterion.

The synchronous machine arrangement may comprise a synchronous rotating machine comprising one of a synchronous motor and a synchronous generator. The machine may be a salient pole or a round rotor machine.

The synchronous machine arrangement may comprise a transformer associated with the synchronous rotating machine and connected in series between the electricity network and the synchronous rotating machine and the synchronous machine arrangement may be disconnected from the network at a first circuit breaker between the synchronous rotating machine and the transformer or at a second circuit breaker between the transformer and the electricity network.

The synchronous rotating machine may be a synchronous power generator at a first power station connected to the electricity network and the reference may be a voltage chosen at another spaced power station connected to the electricity network. The other spaced power station may be a power station physically or geographically closest to the first power station.

Also included within the scope of the present invention is a pole-slip protection rely for an electrical synchronous machine arrangement connected to an electricity network, the protection rely comprising a controller comprising a processing machine configured to execute a program comprising a pole-slip detection and instability prediction algorithm and which controller is configured, in response to a prediction of instability, to cause a protection action, such as a circuit breaker to be operated.

The processing machine may comprise a digital processor and the program may comprise a computer program code.

Yet further included within the scope of the present invention is a computer program having a program code for performing the method as herein defined, when the computer program runs on a processor.

Still further included within the scope of the present invention is a computer readable medium with a computer program having a program code for performing the method as herein defined, when the computer program runs on a processor.

The processor may form part of any suitable processing machine, such as an embedded processor, including a programmable logic controller, a computer, whether a personal computer, lap-top or any other computer.

BRIEF DESCRIPTION OF THE ACCOMPANYING DIAGRAMS

The invention will now further be described, by way of example only, with reference to the accompanying diagrams wherein.

Figure 7:
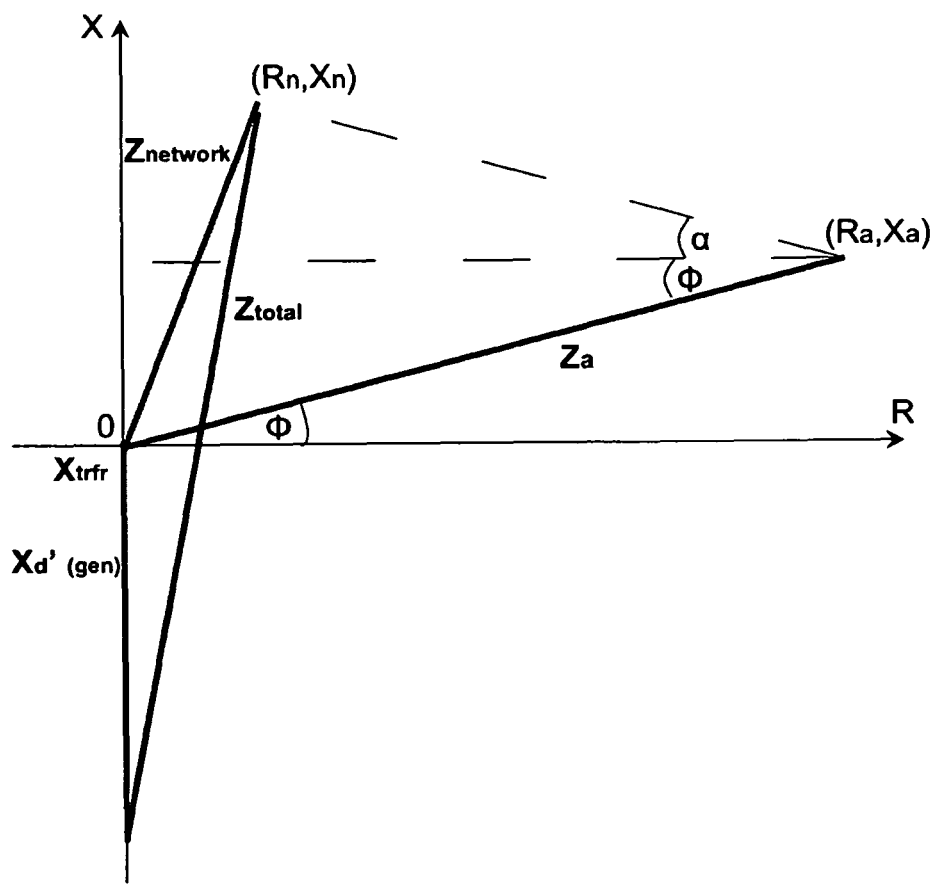
Figure 8:
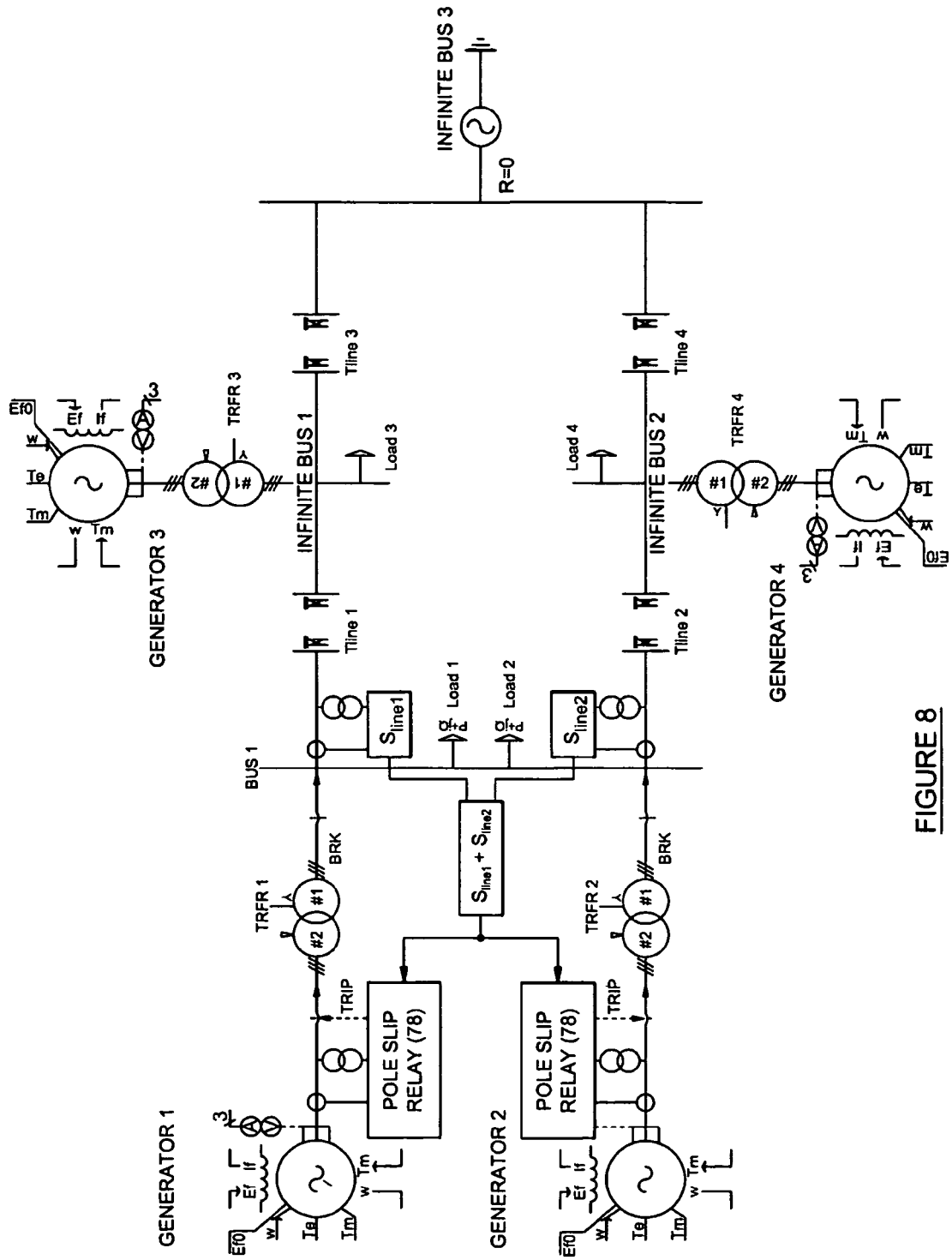
Figure 9:
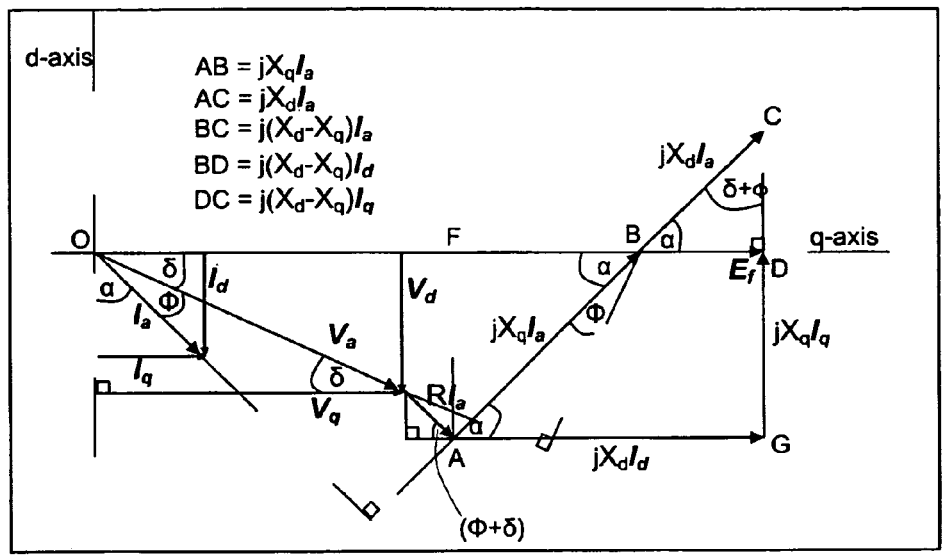
Figure 10:
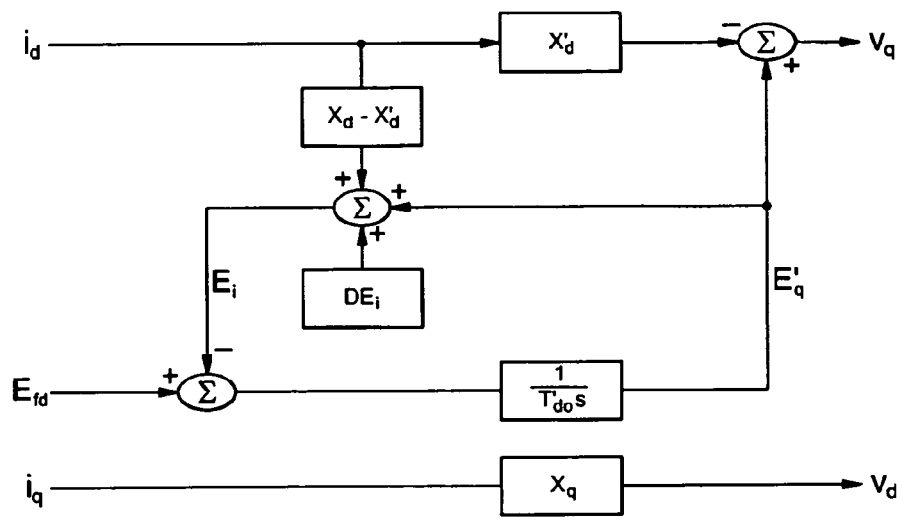
Figure 11:
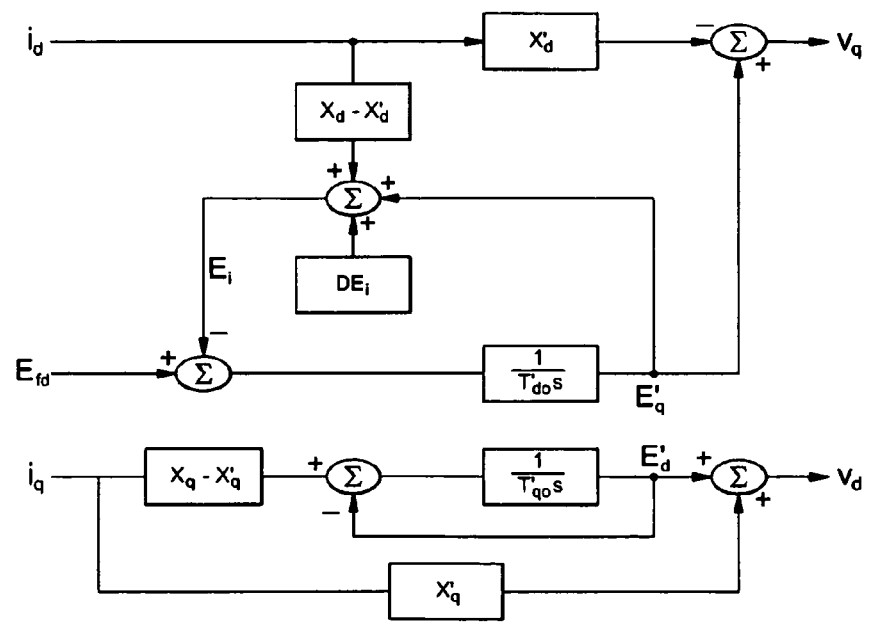
Figure 12:
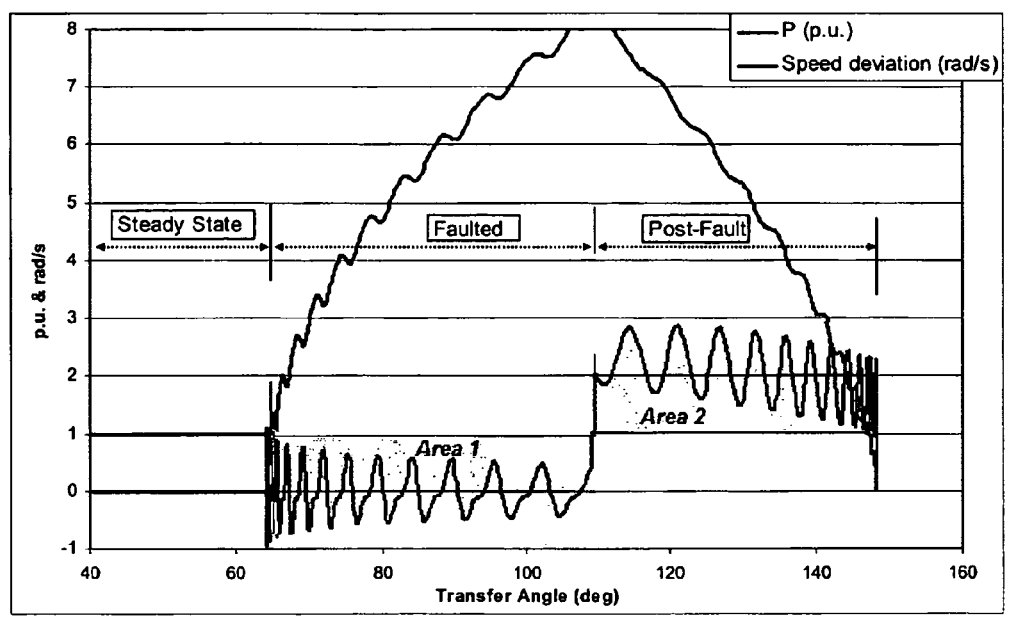
Figure 13:
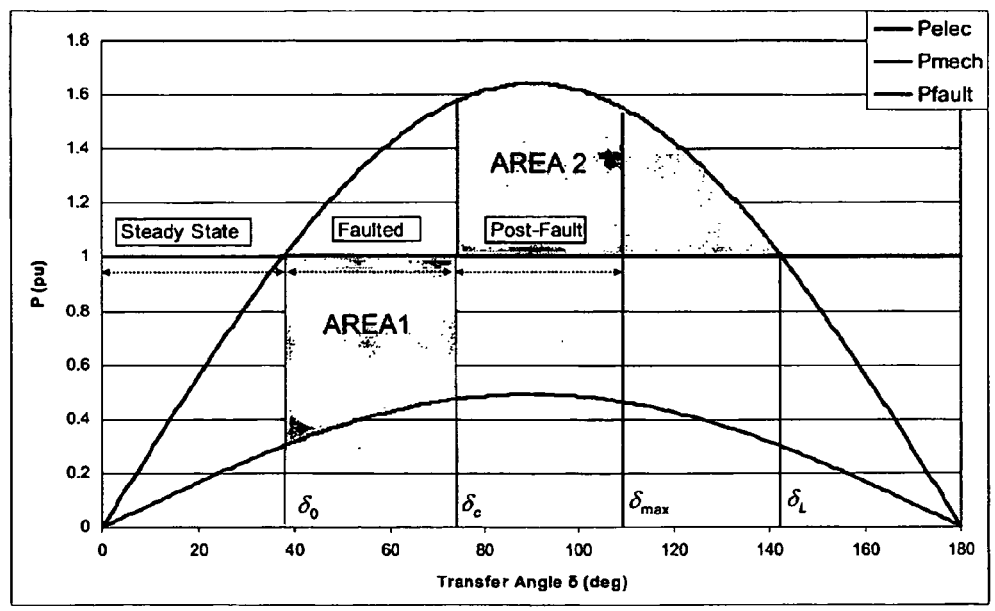
Figure 14:
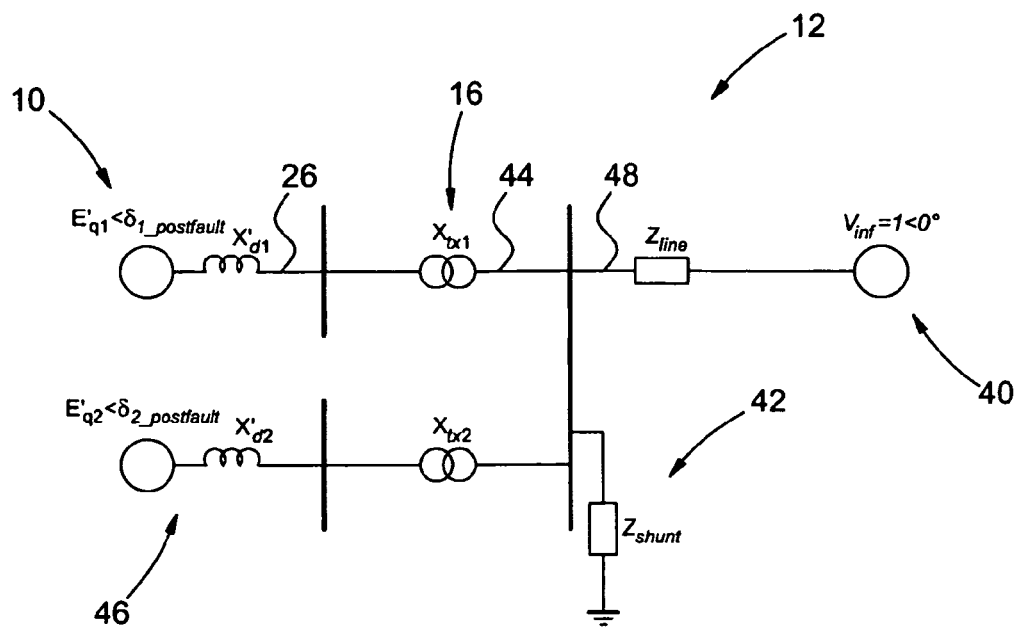
Figure 15:
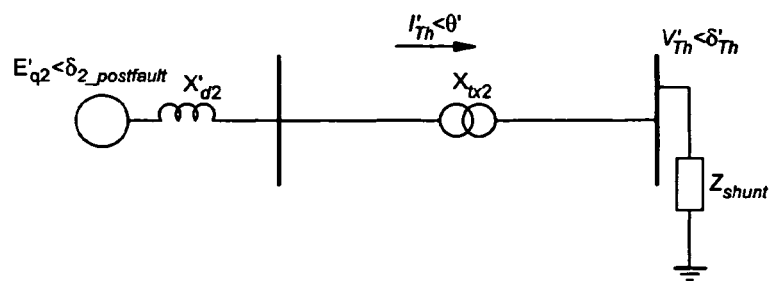
Figure 16:
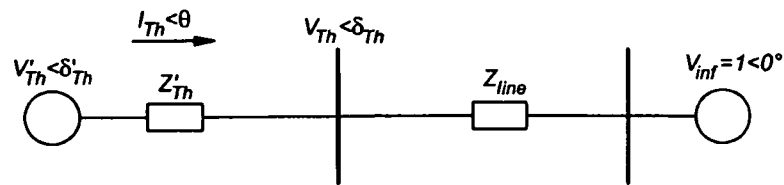
Figure 17:
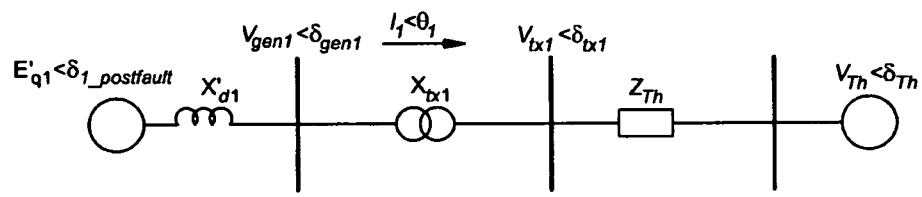
Figure 18:
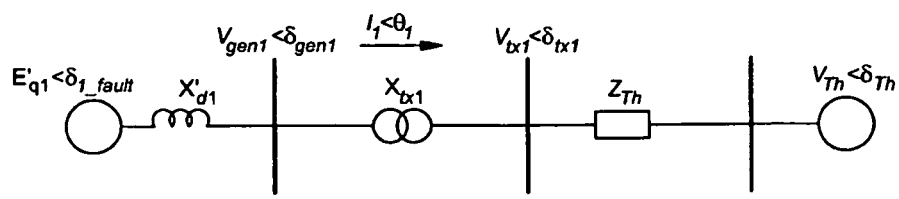
Figure 19:
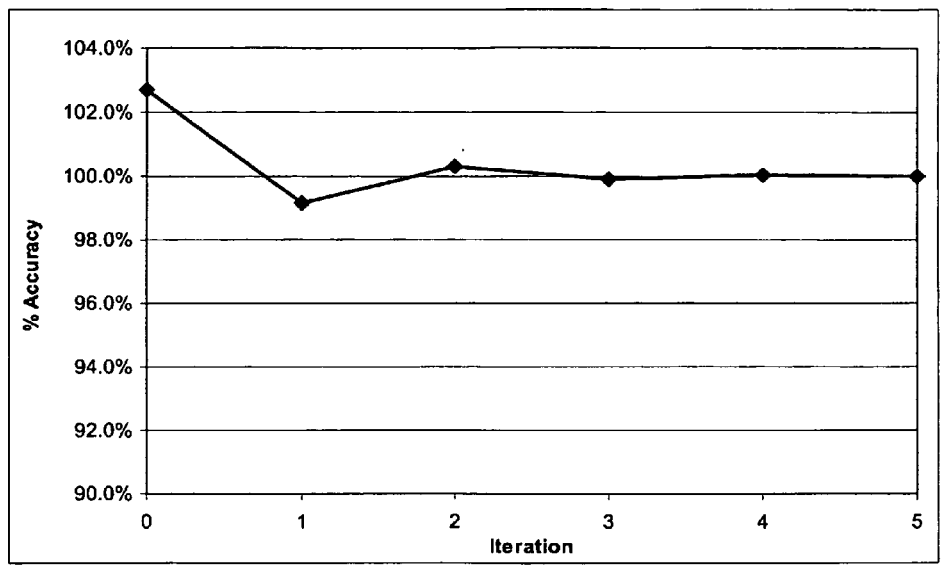
Figure 20:
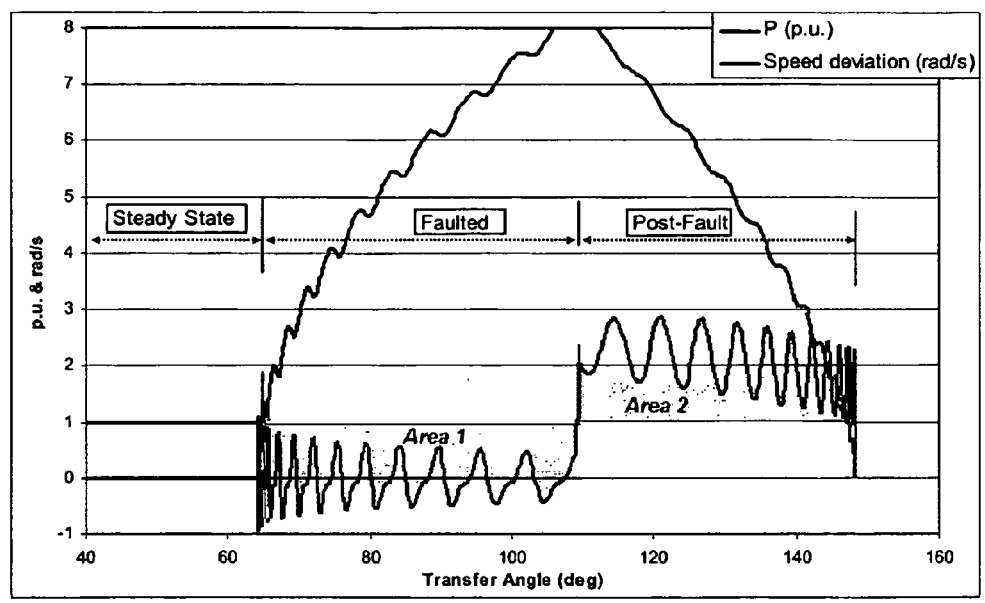
Figure 21:
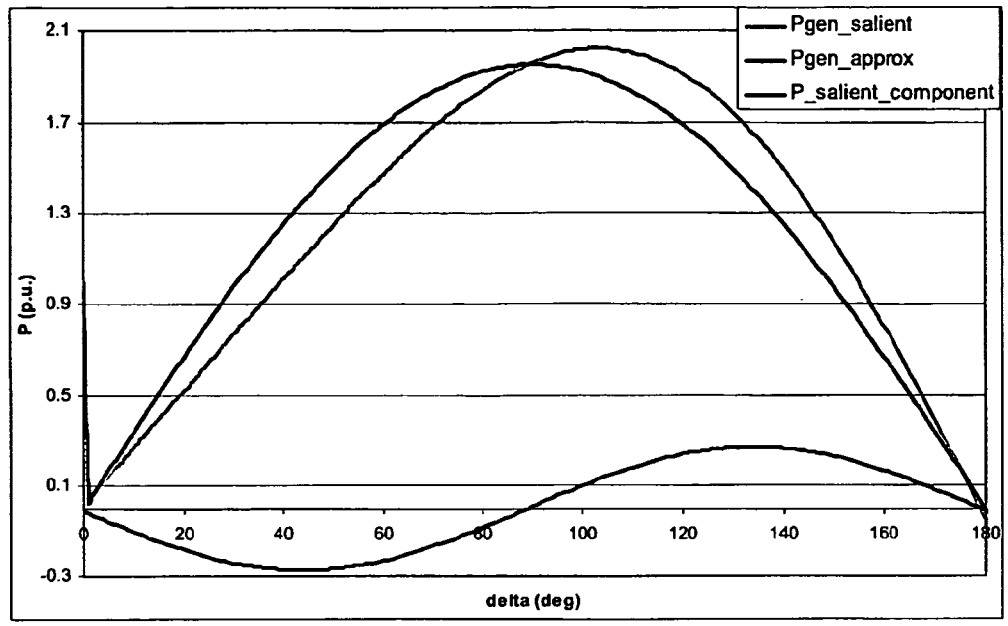

FIGS. 6(a) and (b) illustrate a block diagram of a pole-slip protection algorithm embodied in a pole-slip protection application computer program;

FIG. 7 is a vector diagram for computing a power transfer angle over the transmission line;

FIG. 8 is a block diagram of a power system layout indicating measurement of the real and reactive power of the transmission line feeders;

FIG. 9 is a phasor diagram of a overexcited generator;

FIG. 10 is a block diagram model of a salient pole machine;

FIG. 11 is a block diagram model of a round rotor machine;

FIG. 12 is a graph of rotor speed increase against power transfer angle during faulted and post-fault periods;

FIG. 13 are representations of power transfer during a fault and post-fault against power transfer angle;

FIG. 14 is a circuit diagram of an example electricity network;

FIG. 15 is a first Thevenin equivalent circuit of the circuit in FIG. 14;

FIG. 16 is a second Thevenin equivalent circuit of the circuit in FIG. 14;

FIG. 17 is a third Thevenin equivalent circuit of the circuit in FIG. 14;

FIG. 18 is a fourth Thevenin equivalent circuit of the circuit in FIG. 14;

FIG. 19 is an iteration convergence curve for the accuracy of $\delta_{gen}$ and $\delta_{tx}$;

FIG. 20 are graphs from a PSCAD simulation illustrating the equal area criterion;

FIG. 21 are power curves of a generator with the effect of saliency; and

Figure 22:
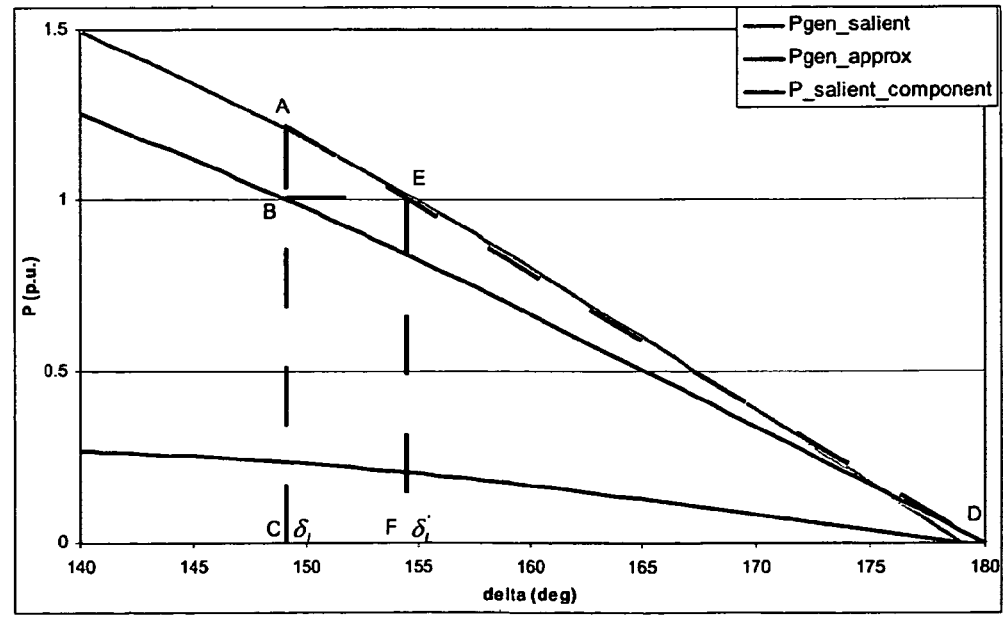

FIG. 22 is a graph illustrating the determination of $\delta_L$ on the power curve with saliency included.

DESCRIPTION OF A PREFERRED EMBODIMENT OF THE INVENTION

Figure 1:
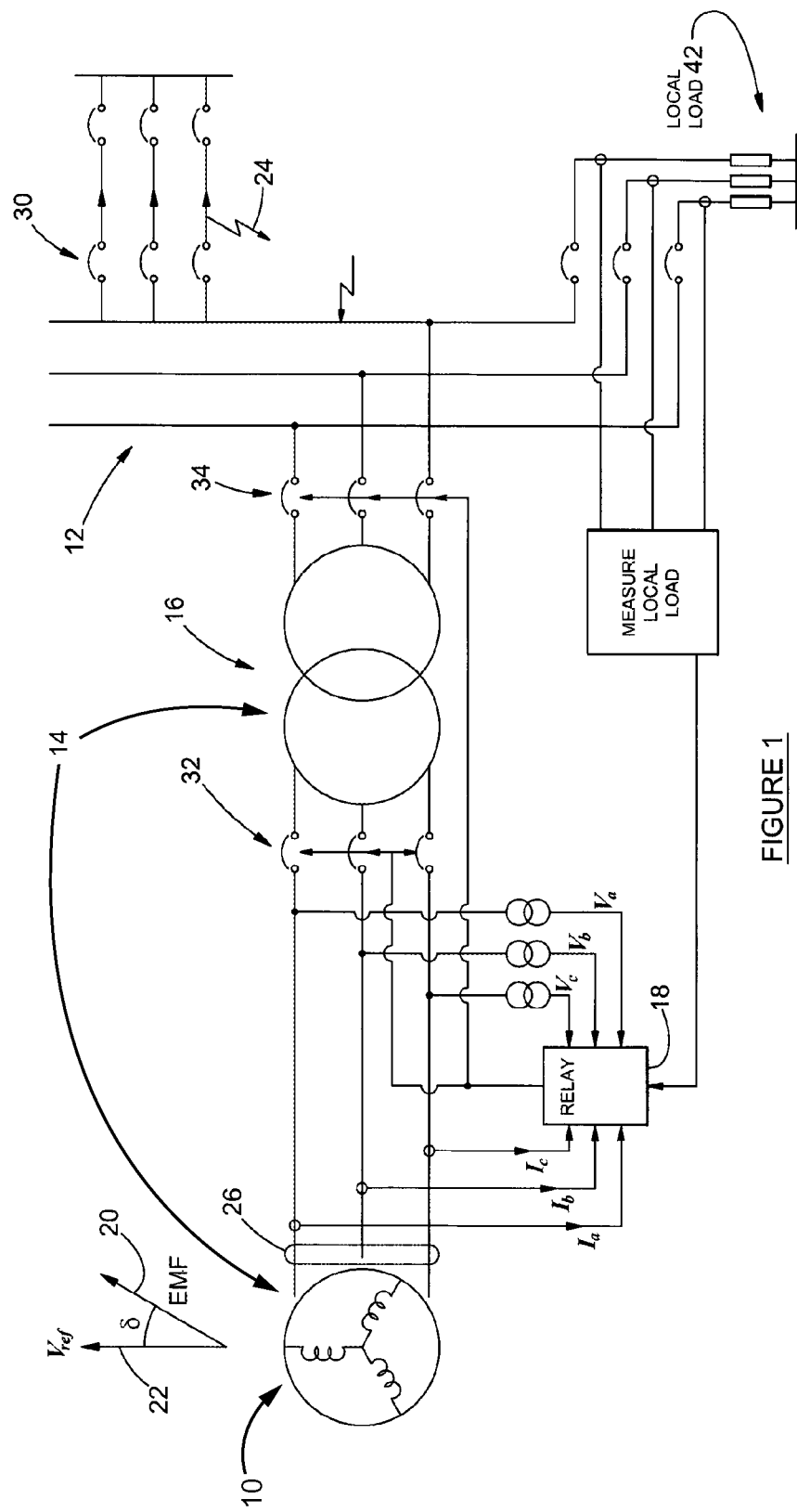
FIG. 1 is a high level diagram of a synchronous power generator connected to an electrical network.
Figure 2:
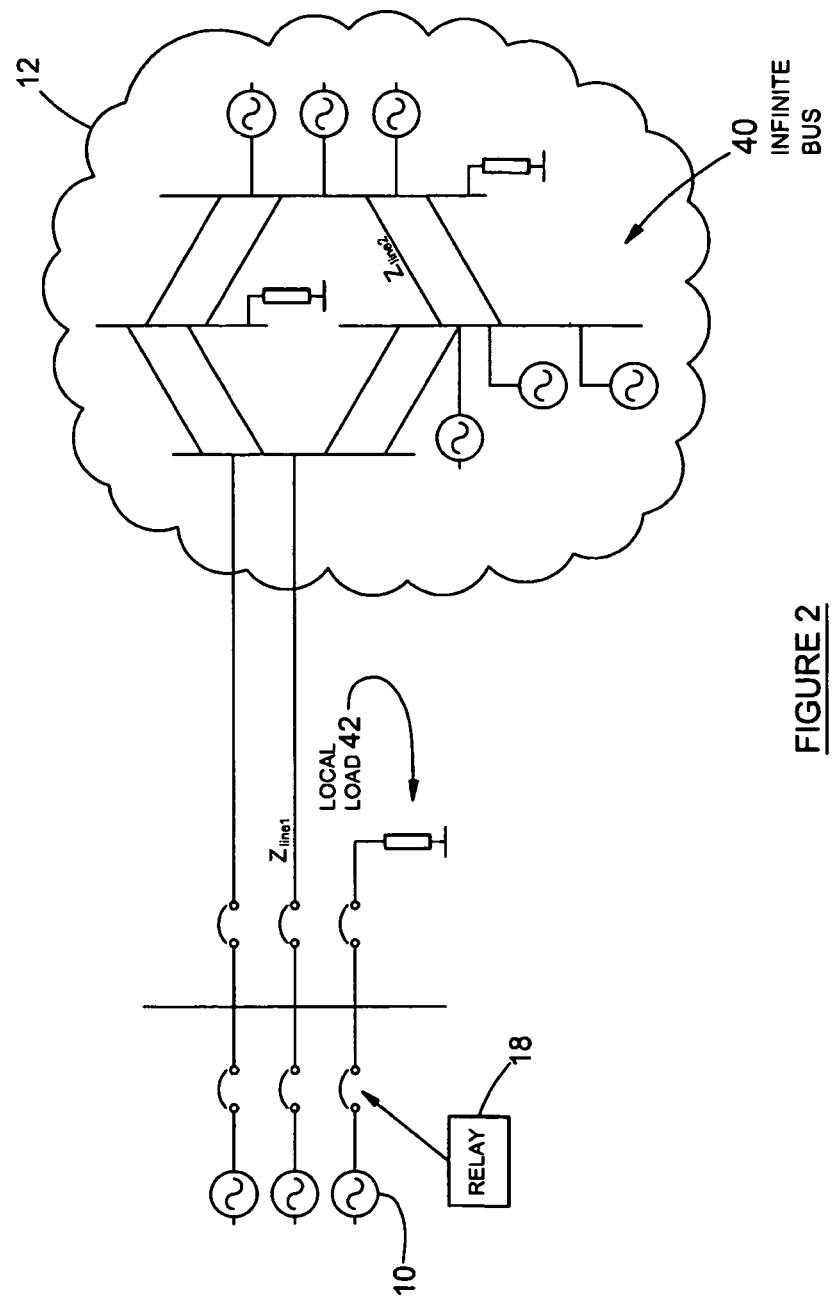
FIG. 2 is a high level diagram of the generator and more detail of the network.

Referring to FIGS. 1 and 2, there is shown a synchronous rotating machine in the form of a power generator 10 connected to an electricity network 12. The machine 10 forms part of a machine arrangement 14 also comprising an associated transformer 16.

A computerized protection relay 18 comprises a controller comprising a processor and an associated memory arrangement. The processor is configured to execute a pole-slip detection and protection application program comprising a program code for performing a method of protecting the synchronous machine arrangement against pole-slip as will hereinafter be described.

Figure 3:
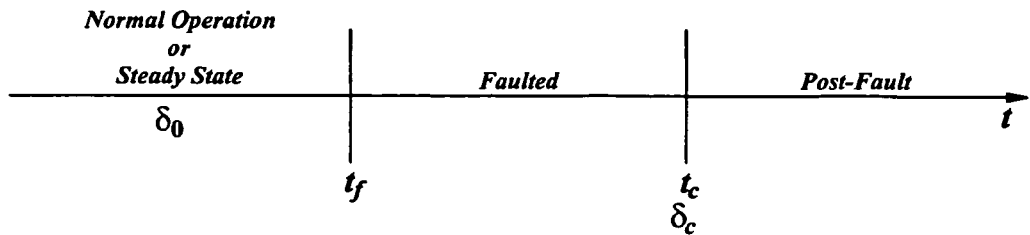
FIG. 3 is a diagram against time of events prior to and following a fault that may cause pole-slip of the generator, until after the fault has been cleared.

The method comprises the steps of the relay 18 continuously computing and monitoring a first variable parameter relating to the machine arrangement with reference to a reference value. In this example embodiment, the first parameter is a power transfer angle ($\delta$) between an electromotive force (EMF) 20 of the machine 10 and a reference voltage ($V_{ref}$) 22. In the event of a fault 24 at a time $t_r$ (shown in FIG. 3) which may result in pole-slip of the machine 10, the relay 18 derives a representation 28 (shown in FIG. 4) of a second parameter relating to the machine arrangement, in this example embodiment power transfer P, against the first parameter power transfer angle ($\delta$) utilizing data relating to a value of a third parameter relating to the machine, in this example embodiment actual voltages (Va, Vb and Vc) and currents (Ia, Ib and Ic) measured on terminals 26 of the machine 10 before the fault has occurred and computed data relating to a fourth parameter, in this example embodiment expected voltages and currents at the terminals of the machine after the fault has occurred. The processor and program utilizes data relating to the representation and a stability criterion to compute a critical value for the transfer angle $\delta$ at which the fault 24 must be cleared (for example by opening relay 30 to isolate the fault) for the machine to regain stability. The relay 18 is configured to disconnect the machine 10 from the network at any one or both of machine circuit breaker 32 or at the high voltage circuit breaker 34, if the fault 24 is not cleared when the transfer angle reaches the critical value.

Hence, the invention provides a new pole-slip protection function that determines when a machine, such as the generator 10 will become unstable after a network fault. If instability is predicted, the generator will be tripped, even before the fault is cleared, to avoid damaging post-fault torque effects.

The reference voltage $V_{ref}$ is a voltage at an infinite bus in the network 12. As shown in FIG. 2, it has been found that the infinite bus can be chosen as the physically or geographically closest other power station 40 to the generator 10 under consideration. This means that only the transmission line impedance $Z_{line1}$ between the generator 10 under consideration and the closest other power station 40 needs to be known. For this assumption to be valid, it was tested that the line impedance between said closest other power station and the rest of the network must be less than 5% of the line impedance $Z_{line1}$ between generator 10 and the closest other power station 40. This assumption has been found to be valid for at least some practical power systems.

When the power system is unstable, one group of generators close to each other can swing with respect to another group of generators that is far away from the first group. In such conditions it is desirable to isolate the two groups of generators from each other without losing all the loads connected to these generators. It is not desirable to trip a generator, since it will worsen the network instability. A generator should only be tripped when stability cannot be maintained after the system disturbance or if generator damage would result after the fault is cleared.

The well known equal area criterion is used in a pole-slip algorithm embodied in the pole-slip protection application program to predict generator stability. The algorithm is divided into steady state calculations and transient calculations. The steady state calculations involve the calculation of the pre-fault transfer angle between the EMF of generator 10 and the infinite bus. The effect of shunt or local loads 42 and generators in parallel to generator 10 is included in the transfer angle calculation.

EMF Eq' of generator 10 is also calculated during steady state conditions. Eq' is used in the transient calculations with the assumption that is will not change during a fault duration of up to 300 ms due to the large field winding time constant Tdo'. The slight increase in Eq' after the fault is cleared, will cause the generator 10 to be more stable. This effect is compensated for in a rotor overshoot factor calculation. The rotor overshoot factor is defined as the time that the rotor remains above synchronous speed after the fault is cleared, divided by the fault duration.

Figure 5:
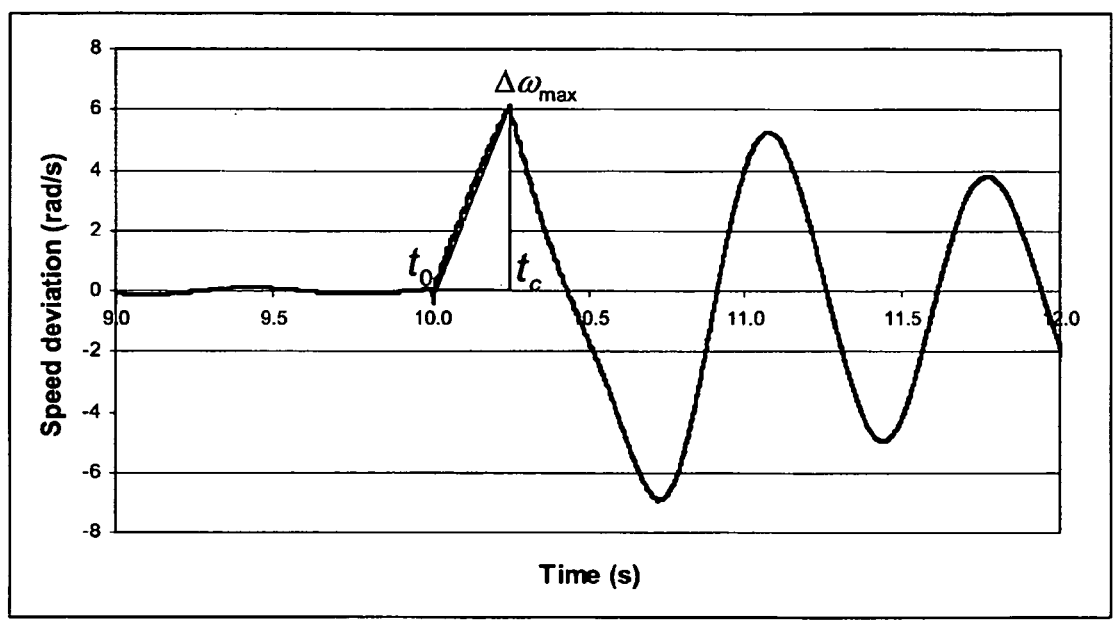
FIG. 5 is a graph against time of generator speed deviation due to a fault in the network.

During a fault, the generator 10 active electrical power output reduces, although the prime mover, such as a turbine (not shown) mechanical power remains approximately constant for the fault duration. This causes the generator rotation speed to increase during the fault as shown in FIG. 5. After the fault is cleared, the generator electrical active power is restored. The electrical active power is greater than the mechanical turbine power after the fault is cleared, and hence the generator 10 will decelerate again to steady state conditions, if stability is maintained.

The period that the generator speed is still above synchronous speed after the fault is cleared (post-fault period), cause the transfer angle to increase further. A greater transfer angle causes a larger generator current, which results in a larger voltage drop on the generator terminals 26 and transformer terminals. The voltage on the generator and transformer terminals greatly influences the stability of the generator. It is therefore important to accurately predict what the rotor overshoot factor, and consequent generator post-fault voltage will be after the fault is cleared.

Apart from voltage magnitudes, the generator and transformer transient power angles must also be determined during the fault for use in the equal area criterion. An iterative solution was developed to calculate the transient power angles.

The larger the rotor overshoot factor, the higher are the chances of generator instability. A rotor overshoot factor of 50% of the calculated value is used to compensate for the assumption of a fixed EMF Eq' and to ensure the pole-slip protection relay 18 will not cause spurious trips.

FIGS. 6(*a*) and (*b*) illustrate a high level block diagram of the new pole-slip protection algorithm embodied in a pole-slip detection and protection application program.

The following equation calculates the pre-fault power transfer angle.

$$\delta_0 = \delta_{Gen} + \delta_{Trfr} + \delta_{Tine} \quad (1.1)$$

where $\delta_0$ is the steady-state power transfer angle between the generator EMF and the infinite bus $\delta_{Gen}$ is the generator steady-state power transfer angle (between the generator EMF and its terminals 26) as calculated per Table 1

$\delta_{Trfr}$ is the transformer steady-state power transfer angle $\delta_{Tine}$ is the transmission line steady-state power transfer angle The steady-state generator power transfer angle $\delta_{Gen}$ is calculated for underexcited and overexcited conditions as is shown in Table 1.

TABLE 1

Algorithms for the calculation of power transfer angle

| Generating mode | Power transfer angle calculation |
|---|---|
| Underexcited (Q < 0) | $\delta_{actual\_gen} = \tan^{-1}\left(\dfrac{I_a X_q \cos\phi}{V_a - I_a X_q \sin\phi}\right)$ |
| Overexcited (Q > 0) | $\delta_{actual\_gen} = \tan^{-1}\left(\dfrac{I_a X_q \cos\phi}{V_a + I_a X_q \sin\phi}\right)$ |

The transformer power transfer angle $\delta_{Trfr}$ is calculated as follows:

$$\delta_{Trfr} = \sin^{-1}\left(\frac{P \cdot X_{Trfr}}{V_{pri} \cdot V_{sec}}\right) \quad (1.2)$$

where

P is the transformer active power $X_{Trfr}$ is the transformer reactance $V_{pri}$ and $V_{sec}$ are the transformer primary and secondary voltages respectively FIG. 7 explains how the network transfer angle is determined by the impedance principle. The following impedances are drawn in the R-X complex impedance plane:

Generator transient direct-axis reactance: $X_d'$.

Step-up transformer reactance: $X_{trfr}$.

Network impedance (transmission lines up to the infinite bus): $Z_n = R_n + jX_n$.

Total system impedance (including generator and transformer): $Z_{total}$.

The impedance as measured by the relay 18: $Z_a = R_a + jX_a$.

Calculated impedance angle $\Phi$ (also the power factor angle).

Transmission line power transfer angle: $\delta_{Tine} = (\Phi + \alpha)$.

The impedance measured by the relay 18 is calculated as follows:

$$|Z_a| = \frac{|V_{an}|}{|I_a|} \quad (1.3)$$

where $V_{an}$ is the generator terminal voltage (line to neutral)

$I_a$ is the generator line current

Also, $$R_a = |Z_{calculated}| \cdot \cos(\phi)$$

$$X_a = |Z_{calculated}| \cdot \sin(\phi) \quad (1.4)$$

where $\phi$ is the power factor angle.

The measured impedance angle $\Phi$ is also the power factor angle:

$$\phi = \tan^{-1}\left(\frac{X_a}{R_a}\right) \quad (1.5)$$

To include the effect of shunt loads, $Z_{a\_corrected}$ is calculated as follows:

$$Z_{a\_corrected} \angle \phi = \frac{V_{pu}^2 \angle 0}{P_{Line\_Total} - jQ_{Line\_Total}} \quad (1.6)$$

From equation (1.6), the angle of $Z_{a\_corrected}$ is calculated as follows:

$$\phi_{corrected} = \tan^{-1}\left(\frac{Q_{Line\_Total}}{P_{Line\_Total}}\right) \quad (1.7)$$

$$|Z_{a\_corrected}| = \frac{|V_{pu}|^2}{\sqrt{(P_{Line\_Total})^2 - (Q_{Line\_Total})^2}} \quad (1.8)$$

From (1.4) the angle $\alpha$ is calculated as follows:

$$X_{a\_corrected} = |Z_{a\_corrected}| \cdot \sin(\phi_{corrected}) \quad (1.9)$$

$$R_{a\_corrected} = |Z_{a\_corrected}| \cdot \cos(\phi_{corrected}) \quad (1.10)$$

$$\alpha = \tan^{-1}\left|\frac{X_{Tline} - X_{a\_corrected}}{R_{a\_corrected} - R_{Tline}}\right| \quad (1.11)$$

The power angle over the transmission line is calculated from FIG. 7 as follows:

$$\delta_{Tline} = \alpha + \phi_{corrected} \quad (1.12)$$

A practical implementation to measure the real- and reactive power of the transmission line feeders is shown in FIG. 8. It can be seen from FIG. 8 that the active- and reactive powers are measured on the transmission line feeders only (no shunt load measurements are taken). A device, like a summation CT, may be installed to summate the active powers of all the transmission line feeders.

FIG. 9 shows the phasor diagram of an overexcited synchronous generator. Since the EMF is located on the q-axis, the sum of the q-axis components alone can determine the EMF. Sum of q-axis components:

$$V_q + I_d X_d = |E_q| \quad (1.13)$$

FIG. 10 and FIG. 11 show the block diagram model of a salient pole and round rotor machine respectively.

From FIG. 10, the transient EMF $E_q'$ can be calculated as follows:

$$E_q' = E_q - i_d(X_d - X_d') \quad (1.14)$$

It can be seen from FIG. 10 and FIG. 11 that the only difference between the round rotor and salient pole model is in the quadrature axis. The phasor diagram in FIG. 9 is not valid for a round rotor machine during transient conditions, since $V_d \neq I_q X_q$. The aim is to determine an effective quadrature axis reactance for round rotor machines that can be described as follows:

$$X_{q\_eff} = \frac{V_d}{I_q} \quad (1.15)$$

From FIG. 9:

$$I_q = I_{gen} \cos(\delta_{gen} + \phi)$$

$$V_d = V_{gen} \sin(\delta_{gen}) \quad (1.16)$$

where
 $I_{gen}$ is the generator line current
 $V_{gen}$ is the generator line voltage
 $\delta_{gen}$ is the generator power transfer angle
 $\phi$ is the generator power factor It has been found that the generator power factor is close to unity after the fault is cleared. This is so due to the fact that the generator has to supply maximum active power in order to decelerate. Almost no reactive power is supplied in the post-fault period. It can therefore be assumed that the power factor angle $\phi$ is close to zero degrees in the post-fault period. $X_{q\_eff}$ is required to determine the post-fault magnitudes of $I_{gen}$ and $V_{gen}$. Equation (1.15) is therefore not practical to use to determine $X_{q\_eff}$. However, it can be seen that $I_q$ will approach 0 as $\delta_{gen}$ approaches 90° (since $\phi$ is assumed to be 0 in the post-fault period). With a larger mechanical turbine power, the increase in rotor speed will be greater during a fault. This will result in a larger $\delta_{gen}$ in the post-fault stage. It has been found that $X_{q\_eff}$ can be approximated as follows in the post-fault period:

$$X_{q\_eff} = X_q \cdot P_{mech} \quad (1.17)$$

A generator will be more stable with a larger $X_{q\_eff}$. The approximation in (1.17) proved to be sufficiently accurate for at least some applications.

FIG. 12 shows a typical rotor speed increase during a fault, with the periods "Faulted" and "Post-fault" depicted as such. During the "post-fault" period, the rotor is still above synchronous speed due to inertia. This causes the power transfer angle to increase during the "post-fault" period. With a larger power transfer angle, larger current will flow, which will cause a greater voltage drop on the terminals of the generator 10 and the transformer 16.

The post-fault voltages (after the fault is cleared) are important to predict, since these voltages are used in the equal area criterion to determine generator stability. The rotor kinetic energy increase during the fault must equal the kinetic energy decrease after the fault is cleared. The rotor angle increase during the post-fault period can be determined by using the calculated "Area 1" in FIG. 13. This area is the same as the area designated "Area 2" in FIG. 13. In order to be conservative towards not tripping the generator 10 spuriously, the region depicted "Area 2" may be assumed to be a rectangle. This rectangle has a vertical side with length $P_{elec}(\delta_c)$, i.e. the value of active power at the instant that the fault is cleared. The horizontal side of this rectangle will represent the power transfer angle increase, after the fault is cleared, or $\delta_{max}$. Due to the assumption of a rectangular area, $\delta_{max}$ will be smaller than the true $\delta_{max}$. This will make the protection function more conservative, since a value of $\delta_c$ where instability may become possible would be around 90° (the point where maximum power transfer occurs). With a "long" vertical side of the rectangle, the horizontal side will be smaller for the same area, and therefore a smaller $\delta_{max}$ will be calculated.

The maximum power transfer angle $\delta_{max}$ after the fault is cleared can be determined as follows:

$$\delta_{max} = \delta_{postfault} = \frac{Area\ 1}{P_{elec}(\delta_c) - P_{mech}} \quad (1.18)$$

where
 $P_{elec}(\delta_c)$ is the power transfer at the instant that the fault is cleared
 $P_{mech}$ is the pre-fault mechanical prime mover power The voltage on the generator terminals 26 and the terminals of the step-up transformer 16 greatly influences the stability of the generator 10 after the fault is cleared. The expected post-fault current needs to be calculated, before the fault is cleared, to predict the post-fault voltages on the different busses.

In the description to follow, it is assumed that the infinite bus voltage Vinf=1∠0°. FIG. 14 shows a circuit diagram of an example complete electricity network comprising generator 10 with associated step-up transformer 16, a second generator 46 and associated transformer in parallel, a shunt load 42 and the transmission line 48. The aim is to determine the post-fault voltages on the terminals 26 of generator 10 and on the secondary terminals 44 of transformer 16. These voltages are to be used in the equal area criterion for generator 10 and transformer 16 respectively, to determine stability after the fault is cleared.

In FIG. 15, there is shown the Thevenin equivalent circuit resulting from the generator 46 in parallel and with the transmission line 48 and shunt loads 42 connected. The only equipment that is disconnected from this Thevenin circuit is generator 10. In deriving the equivalent circuit, the first step is to determine the current of generator 46 ($I_{Th}'\angle\theta'$) as if only the shunt loads 42 were connected to generator 46. This current is then used to determine the Thevenin voltage $V_{Th}'\angle\delta_{Th}'$.

$$I_{Th}'\angle\theta' = \frac{E_{q2}'\angle\delta_{2\_postfault}}{jX_{d2}' + jX_{tx2} + R_{Sh} + jX_{Sh}} \quad (1.19)$$

The angle $\delta_{2\_postfault}$ is calculated in (1.18)

$\delta_{2\_postfauft}$ is used to calculate the expected post-fault voltage magnitudes that are used in the equal area stability calculation.

From FIG. 15:

$$V_{Th}'\angle\delta_{Th}' = E_{q2}'\angle\delta_{2\_postfault} - I_{Th}'\angle\theta'\cdot(jX_{d2}'+jX_{tx2}) \quad (1.20)$$

$I_{Th}'\angle\theta'$ does not include the current of the generator 10 under consideration. $I_{Th}'\angle\theta'$ represents only the currents of the generators that are parallel to generator 10. Hence, in this example, $I_{Th}'\angle\theta'$ is the current of generator 46 with the shunt loads 42 included.

It is important to note that the calculation of the generator current in (1.19) is only an approximation, with the generator saliency effect neglected. However, it has been found that the current calculation is sufficiently accurate to determine the post-fault voltage magnitudes on the generator terminals 26 and step-up transformer terminals 44 for at least some applications.

The voltage $V_{Th}'\angle\delta_{Th}'$ as calculated in (1.20) is used in a second Thevenin equivalent circuit as shown in FIG. 16 to determine the current $I_{Th}\angle\theta$. This current is equivalent to the current that would flow in the transmission line 48 when generator 10 is disconnected. In order to calculate $I_{Th}\angle\theta$, the Thevenin impedance $Z_{Th}'$ must be determined as follows:

$$Z_{Th}' = \frac{(jX_{d2}' + jX_{tx2})\cdot(R_{Sh} + jX_{Sh})}{jX_{d2}' + jX_{tx2} + R_{Sh} + jX_{Sh}} \quad (1.21)$$

$$I_{Th}\angle\theta = \frac{V_{Th}'\angle\delta_{Th}' - V_{inf}\angle 0°}{Z_{Th}' + R_l + jX_l} \quad (1.22)$$

$$V_{Th}\angle\delta_{Th} = V_{Th}'\angle\delta_{Th}' - I_{Th}\angle\theta\cdot(R_{Th}' + jX_{Th}') \quad (1.23)$$

The voltage $V_{Th}\angle\delta_{Th}$ as calculated in (1.20) is used as shown in the third Thevenin equivalent circuit as shown in FIG. 17, to determine the current of generator 10, namely $I_1\angle\theta_1$. In order to calculate $I_1\angle\theta_1$, the Thevenin impedance $Z_{Th}$ must be determined as follows:

$$Z_{Th} = \frac{Z_{Th}'\cdot Z_l}{Z_{Th}' + Z_l} \quad (1.24)$$

$$I_1\angle\theta_1 = \frac{E_{q1}'\angle\delta_{1\_postfault} - V_{Th}\angle\delta_{Th}}{jX_d' + jX_{tx} + jX_{Th} + R_{Th}} \quad (1.25)$$

The generator terminal 26 voltage $V_{gen1\_postfault}\angle\delta_{gen1}$ and transformer secondary 44 voltage $V_{tr1}\angle\delta_{tr1\_postfault}$ are calculated as follows:

$$V_{gen1\_postfault}\angle\delta_{gen1}' = E_{q1}'\angle\delta_{1\_postfault} - I_1\angle\theta_1\cdot jX_{d1}' \quad (1.26)$$

$$V_{tx1\_postfault}\angle\delta_{tr1} = E_{q1}'\angle\delta_{1\_postfault} - I_1\angle\theta_1\cdot(jX_{d1}' + jX_{tx1}) \quad (1.27)$$

Since the generator saliency effect is not included in the calculation of the generator current in (1.25), the voltage angles in (1.26) and (1.27) may not be accurate enough for stability study purposes. The bus voltage magnitudes calculated in (1.26) and (1.27) are therefore used in the equal area criterion. An iterative algorithm as hereinafter described is used to determine the generator power angle and the voltage angle over the transformer, which is also used in the equal area criterion.

The during-fault voltages and currents may be considered to be the voltages and currents at the instant when the fault is cleared. These voltages on the terminals 26, 44 of the generator 10 and step-up transformer 16 may be calculated at the instant the fault is cleared. These voltage magnitudes are used to determine the transient power transfer angles of the generator and transformer during the fault. These power transfer angles are used in the equal area criterion.

Calculations similar to those set out hereinbefore, may be performed to obtain the during-fault voltages on the generator and transformer terminals as follows and by referring to FIG. 18:

$$V_{gen1\_fault}\angle\delta_{gen1} = E_{q1}'\angle\delta_{1\_fault} - I_1\angle\theta_1\cdot jX_{d1}' \quad (1.28)$$

$$V_{tx1\_fault}\angle\delta_{tx1} = E_{q1}'\angle\delta_{1\_fault} - I_1\angle\theta_1\cdot(jX_{d1}' + jX_{tx1}) \quad (1.29)$$

The generator 10 power transfer angle $\delta_{gen}$ and the voltage angle over the transformer $\delta_{tx}$ are required to determine where instability will occur by using two different equal area criteria calculations. The first equal area criterion calculation determines generator stability by including generator saliency effects, while the other equal area criterion calculation determines the stability of the step-up transformer 16. The initial estimate for $\delta_{gen}$ and $\delta_{tx}$ determined as follows:

$$\delta_{gen}(0) = \delta_{Th1}\cdot\frac{X_d'}{X_{tx} + X_d'}\cdot\frac{V_{gen}}{E_q'} \quad (1.30)$$

$$\delta_{tx}(0) = \delta_{Th1} - \delta_{gen} \quad (1.31)$$

$$\delta_{Th1} = \delta_c - \delta_{Th} \quad (1.32)$$

Where
$\delta_{gen}$ is the generator internal power transfer angle
$\delta_{tx}$ is the transformer power transfer angle $\delta_{Th}$ is the power transfer angle on the Thevenin bus (i.e. the transformer high voltage terminals)

$\delta_c$ is the power transfer angle between the EMF and the infinite bus at the instant that the fault is cleared, as is calculated in (1.37)

$V_{gen}$ is the generator terminal voltage (p.u)

$E_q'$ is the generator internal EMF

Since there exists no explicit solution to the following equations, an iterative solution may be followed in order to determine $\delta_{gen}$ and $\delta_{tx}$. The generator power ($P_{gen}$) and transformer power ($P_{tx}$) are determined in terms of the iteration index (i):

$$P_{gen}(i) = \frac{E_q' \cdot V_{gen}}{X_d'} \sin\delta_{gen}(i) + \frac{V_{gen}^2}{2}\left(\frac{1}{X_q'} - \frac{1}{X_d'}\right)\sin(2\delta_{gen}(i)) \quad (1.33)$$

$$P_{tx}(i) = \frac{|V_{gen}| \cdot |V_{Th}|}{|jX_{tx}|}\sin(\delta_{tx}(i)) \quad (1.34)$$

$P_{gen}=P_{tx}$, when resistance losses are neglected. The aim is to find a solution for $\delta_{gen}$ with $P_{gen}=P_{tx}$. By substituting (1.31) into (1.34), $\delta_{gen}$ can be solved. There is no explicit solution for $\delta_{gen}$ when (1.33) is set equal to (1.34). For that reason, an iterative solution must be found for $\delta_{gen}$. For an iterative index chosen as (i):

$$\delta_{gen}(i) = |\delta_{gen}(i-1) - (P_{gen}(i-1) - P_{tx}(i-1)) \cdot K_1| \quad (1.35)$$

$$\delta_{tx}(i) = \delta_{Th1} - \delta_{gen}(i) \quad (1.36)$$

The constant $K_1$ was tested for various scenarios. It was found that the solution converges the fastest when $K_1$ is chosen to be $K_1=7/Vgen$. The choice for $K_1$ is valid when the angles are in degrees and the active power P in per unit. FIG. 19 presents a typical convergence curve for the accuracy in $\delta_{gen}$ and $\delta_{tx}$. The iterative algorithm reaches a solution that is typically 99.5% of the true value within 5 iterations.

It must be kept in mind that the abovementioned iterative process takes place while the fault occurs. After a solution for $\delta_{gen}$ and $\delta_{tx}$ has been found, a new value of the Thevenin transfer angle $\delta_{Th}$ is used to determine $\delta_{gen}$ and $\delta_{tx}$ again in the iterative process. In parallel with this process, the equal area criteria of the generator, transformer and transmission line are calculated to determine whether instability may occur, after the fault is cleared.

Figure 4:
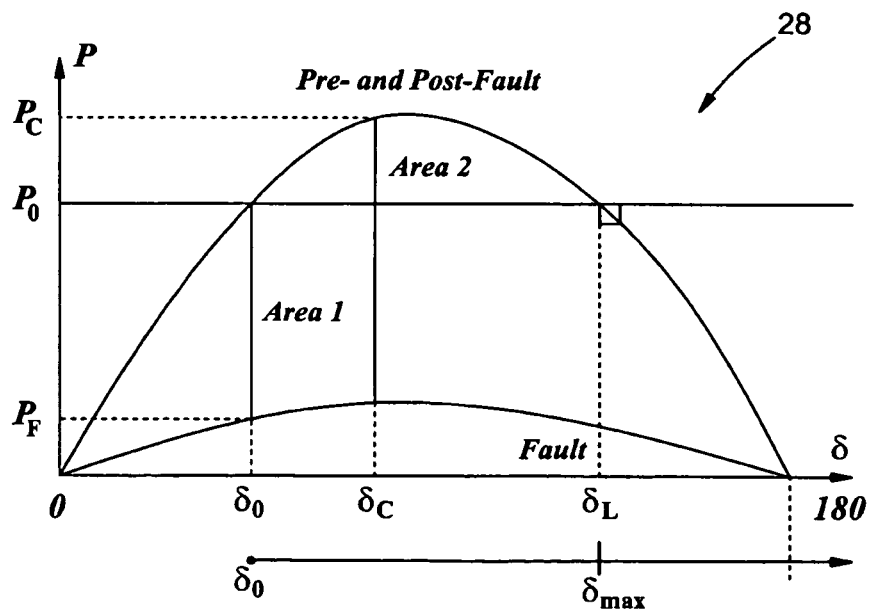
FIG. 4 is a representation of power output against a power transfer angle of the generator.

Referring to FIG. 4, the equal area criterion states that the accelerating area under the active power curve (Area 1) must be less than the decelerating area (Area 2) for stability to be maintained. The mechanical prime-mover power is denoted as Po in FIG. 4.

FIG. 20 shows the active power curve in the steady-state, in the faulted and post-fault conditions. The equal area criteria for the pole-slip function will be performed for the generator 10 (with saliency effects included in the power curve) and for the step-up transformer. If instability is predicted to occur in the generator 10 or the step-up transformer 16, the generator 10 must be disconnected from the network 12, or tripped, before the fault 24 is cleared.

The increase in rotor angle $\Delta\delta_{rotor}$ must be added to the pre-fault transfer angle $\delta_0$ to obtain the post-fault power transfer angle between the generator EMF and the network infinite bus. The post-fault power transfer angle is calculated as:

$$\delta_c = \delta_0 + \Delta\delta_{rotor} \quad (1.37)$$

where $\Delta\delta_{rotor}$ is the increase in rotor angle due to the fault.

Area 1 is calculated by integrating from the pre-fault transfer angle ($\delta_0$) to the post-fault transfer angle $\delta_c$ as determined by equation (1.37).

The accelerating area (Area 1) for the generator 10 and step-up transformer 16 respectively, may be calculated as follows:

$$Area_1 = \int_{\delta_0}^{\delta_c}(P_0 - P_{fault}) \cdot d\delta \quad (1.38)$$

$$= \sum_{t_0}^{t_c}[(P_0 - P_{fault}(t)) \cdot \Delta\delta_{rotor}(t)]$$

The decelerating area (Area 2) for the generator 10 is calculated as follows:

$$Area_{2\_gen} = \int_{\delta_{c\_gen}}^{\delta_{L\_gen}}\left[\begin{array}{c}\frac{E_q' \cdot V_{gen}}{X_d'}\sin\delta_{gen} + \\ \frac{V_{gen}^2}{2}\left(\frac{1}{X_q'} - \frac{1}{X_d'}\right)\sin(2\delta_{gen})\end{array}\right] \cdot d\delta_{gen} \quad (1.39)$$

$$= \frac{1}{4}V_{gen}^2\left(\frac{1}{X_q'} - \frac{1}{X_d'}\right)(\cos(2\delta_{c\_gen}) - \cos(2\delta_{L\_gen})) +$$

$$\frac{E_q' \cdot V_{gen}}{X_d'}(\cos(\delta_{c\_gen}) - \cos(\delta_{L\_gen})) -$$

$$P_0(\delta_{L\_gen} - \delta_{c\_gen})$$

The decelerating area (Area 2) for the transformer 16 is calculated as follows:

$$Area_{2\_tx} = \int_{\delta_{c\_tx}}^{\delta_{L\_tx}}\left[\frac{V_{gen} \cdot V_{tx\_sec}}{X_{tx}}\sin\delta_{tx} - P_0\right] \cdot d\delta_{tx} \quad (1.40)$$

$$= \frac{V_{gen} \cdot V_{tx\_sec}}{X_{tx}}(\cos\delta_{c\_tx} - \cos\delta_{L\_tx}) - P_0(\delta_{L\_tx} - \delta_{c\_tx})$$

The angle $\delta_L$ indicated in FIG. 4 is the maximum allowable transfer angle for stability to be maintained and can be determined as follows:

$$P_0 = \frac{E_q' \cdot V_{gen}}{X_{total}} \cdot \sin\delta_L \quad (1.41)$$

$$\therefore \delta_L = 180° - \sin^{-1}\left(\frac{P_0 \cdot X_{total}}{E_q' \cdot V_{gen}}\right) \quad (1.42)$$

where $X_{total} = X_d' + X_{network}$ $X_{network}$ is the network impedance from the generator terminals up to the infinite bus $X_d'$ is the generator transient direct-axis reactance.

There is no explicit solution for $\delta_L$ for the saliency power curve in equation (1.33). The saliency curves are shown in FIG. 21. A trigonometric solution for $\delta_L'$ obtained in FIG. 21 by using the prime-mover power as 1 pu in this illustration.

A vertical line may be drawn from the point where Papprox (without saliency) intersects with the prime-mover power (point B) to point A where this vertical line intersects with Pgen_salient. A line can be drawn from 180° (point D) to point A. The intersection with the prime-mover power (point E) can be regarded as $\delta_L'$.

It can be seen from FIG. 22 that the portion of Pgen_salient from $\delta_L$ to 180° is close to a straight line. This approximation to determine $\delta_L'$ was tested for various operating conditions. The error in $\delta_L'$ was consistently less than 0.5°. It is has been found that this accuracy in $\delta_L'$ is sufficient for equal area calculations for at least some applications.

The gradient m of line AD in FIG. 22 is determined as follows:

$$m = \frac{AB}{BE} = \frac{AC}{CD} = \frac{180° - \delta_L}{P_{salient}(\delta_L)} \tag{1.43}$$

where $\delta_L$ is determined by equation (1.42).
Following from (1.43):

$$BE = \frac{AB}{m} = \frac{P_{salient}(\delta_L) - P_o}{m} \tag{1.44}$$

where $P_o$ is the prime-mover power (Po=1 pu in this illustration) $\delta_L'$ is calculated as follows:

$$\therefore \delta_L' = \delta_L + BE \tag{1.45}$$

By substituting (1.42), (1.43), and (1.44) into (1.45) gives:

$$\delta_L' = 180° - \sin^{-1}\left(\frac{P_0 \cdot X_{total}}{E_{gen} \cdot V_{inf}}\right) + (P_{salient}(\delta_L) - P_o) \cdot \frac{P_{salient}(\delta_L)}{180° - \delta_L}. \tag{1.46}$$

The equal area states that the machine shall be tripped if the following condition is met for either the generator 10 or the transformer 16:

Trip if: Area1>Area2

The invention claimed is:

1. A method of protecting a synchronous machine arrangement connected to an electricity network against pole-slip, the method comprising the steps of:
   continuously monitoring a first variable parameter relating to the machine arrangement in the form of power transfer angle between an electromotive force (EMF) with reference to a reference voltage (Vref);
   in the event of a fault on the electricity network which may result in pole-slip of the machine arrangement, deriving a representation of a second parameter relating to the machine arrangement in the form of power transfer P against the first parameter utilizing data relating to a value of a third parameter relating to the machine arrangement in the form of at least one of actual voltage and current measured on a terminal of the machine arrangement before the fault has occurred and computed data relating to an expected future value of a fourth parameter relating to the machine arrangement in the form of at least one of voltage and current on the terminal of the machine arrangement after the fault has occurred;
   utilizing the representation and a stability criterion to predict whether the machine arrangement may become unstable; and
   if instability is predicted, causing the machine arrangement to be disconnected from the electricity network.

2. The method as claimed in claim 1, wherein the reference voltage is at an infinite bus in the electricity network.

3. The method as claimed in claim 1 further comprising the step of utilizing the representation and the stability criterion to compute a critical value of the first parameter at which the fault must be cleared for the machine arrangement to regain stability and wherein, if the first parameter reaches the critical value, the machine arrangement is caused to be disconnected from the network.

4. The method as claimed in claim 1, wherein the stability criterion is the equal area stability criterion.

5. The method as claimed in claim 1, wherein the machine arrangement is disconnected from the electricity network before the fault is cleared.

6. The method as claimed in claim 1, wherein the synchronous machine arrangement comprises a synchronous rotating machine comprising one of a synchronous motor and a synchronous generator.

7. The method as claimed in claim 6, wherein the synchronous machine arrangement comprises a transformer associated with the synchronous rotating machine and connected in series between the electricity network and the synchronous rotating machine and wherein the synchronous machine arrangement is disconnected from the network at a first circuit breaker between the synchronous rotating machine and the transformer or at a second circuit breaker between the transformer and the electricity network.

8. The method as claimed in claim 6, wherein the synchronous rotating machine is a synchronous power generator at a first power station connected to the electricity network and the reference is a voltage chosen at another spaced power station connected to the electricity network.

9. The method as claimed in claim 8, wherein the other spaced power station is a power station physically closest to the first power station.

10. A pole-slip protection rely for an electrical synchronous machine arrangement connected to an electricity network, the protection rely comprising a controller comprising a processing machine configured to execute a computer program having a program code for performing the method of claim 1, when the computer program runs on the processing machine.

11. A computer program having a program code for performing the method of claim 1, when the computer program runs on a processor.

12. A computer readable medium with a computer program having a program code for performing the method of claim 1, when the computer program runs on a processor.

13. The method as claimed in claim 1 wherein the reference voltage is at an infinite bus in the electricity network.

14. A method of protecting a synchronous machine arrangement connected to an electricity network against pole-slip, the method comprising the steps of:
   continuously monitoring a first variable parameter relating to the machine arrangement with reference to a reference value;
   in the event of a fault on the electricity network which may result in pole-slip of the machine arrangement, deriving a representation of a second parameter relating to the machine arrangement against the first parameter utilizing data relating to a value of a third parameter relating to the machine arrangement before the fault has occurred and computed data relating to an expected future value of a fourth parameter relating to the machine arrangement after the fault has occurred;
   utilizing the representation and a stability criterion to predict whether the machine arrangement may become unstable; and
   if instability is predicted, causing the machine arrangement to be disconnected from the electricity network, and wherein the first parameter is a power transfer angle between an electromotive force (EMF) of the machine arrangement and the reference value in the form of a reference voltage (Vref) and wherein the second parameter is power transfer relating to the machine arrangement.

15. The method as claimed in claim 14, wherein the third parameter is at least one of an actual voltage and current measured on a terminal of the machine arrangement.

16. The method as claimed in claim 14, wherein the fourth parameter is at least one of a voltage and a current on the terminal of the machine arrangement.

17. The method as claimed in claim 14, comprising the step of utilizing the representation and the stability criterion to compute a critical value of the first parameter at which the fault must be cleared for the machine arrangement to regain stability and wherein, if the first parameter reaches the critical value, the machine arrangement is caused to be disconnected from the network.

18. A method as claimed in claim 14, wherein the stability criterion is the equal area stability criterion.

19. The method as claimed in claim 14, wherein the machine arrangement is disconnected from the electricity network before the fault is cleared.

20. A method as claimed in claim 14, wherein the synchronous machine arrangement comprises a synchronous rotating machine comprising one of a synchronous motor and a synchronous generator.

21. The method as claimed in claim 20, wherein the synchronous machine arrangement comprises a transformer associated with the synchronous rotating machine and connected in series between the electricity network and the synchronous rotating machine and wherein the synchronous machine arrangement is disconnected from the network at a first circuit breaker between the synchronous rotating machine and the transformer or at a second circuit breaker between the transformer and the electricity network.

22. The method as claimed in claim 20, wherein the synchronous rotating machine is a synchronous power generator at a first power station connected to the electricity network and the reference is a voltage chosen at another spaced power station connected to the electricity network.

23. The method as claimed in claim 22, wherein the other spaced power station is a power station physically closest to the first power station.

24. A method of protecting a synchronous machine arrangement connected to an electricity network against pole-slip, the method comprising the steps of:
continuously monitoring a first variable parameter relating to the machine arrangement in the form of power transfer angle between an electromotive force (EMF) with reference to a reference voltage (Vref);
in the event of a fault or disturbance on the electricity network which may result in pole-slip of the machine arrangement, deriving a representation of a second parameter relating to the machine arrangement in the form of power transfer P against the first parameter utilizing data relating to a value of a third parameter relating to the machine arrangement in the form of at least one of actual voltage and current measured on a terminal of the machine arrangement before the fault or disturbance has occurred and computed data relating to an expected future value of a fourth parameter relating to the machine arrangement in the form of at least one of voltage and current on the terminal of the machine arrangement after the fault or disturbance has occurred;
utilizing the representation and a stability criterion to predict whether the machine arrangement may become unstable; and
if instability is predicted, causing the machine arrangement to be disconnected from the electricity network.

* * * * *